US007422232B2

(12) United States Patent
Cowelchuk et al.

(10) Patent No.: US 7,422,232 B2
(45) Date of Patent: Sep. 9, 2008

(54) AIRBAG ASSEMBLY

(75) Inventors: Glenn A. Cowelchuk, Chesterfield Township, MI (US); Todd L. DePue, Brighton, MI (US); Michael W. Cass, Lenox, MI (US); Robert J. Adams, Ypsilanti, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 11/535,191

(22) Filed: Sep. 26, 2006

(65) Prior Publication Data
US 2008/0073885 A1 Mar. 27, 2008

(51) Int. Cl.
*B60R 21/20* (2006.01)
(52) U.S. Cl. .................................. 280/728.3
(58) Field of Classification Search ............. 280/728.3, 280/732
See application file for complete search history.

(56) References Cited

U.S. PATENT DOCUMENTS

| 5,769,451 | A  |   | 6/1998 | Inada et al. |
| 6,109,645 | A  |   | 8/2000 | Totani et al. |
| 6,406,056 | B2 |   | 6/2002 | Yokota |
| 6,929,280 | B2 |   | 8/2005 | Yasuda et al. |
| 7,234,724 | B1 | * | 6/2007 | Cowelchuk et al. ...... 280/728.2 |

* cited by examiner

*Primary Examiner*—Faye M. Fleming
(74) *Attorney, Agent, or Firm*—Brooks Kushman P.C.

(57) ABSTRACT

In at least one embodiment, the present invention relates an airbag assembly for use with a trim panel having a tear seam forming at least one airbag door, and a door chute assembly comprising a laterally extending flange connected to the panel proximate the airbag door. The door chute assembly includes a chute depending from the flange away from the panel and the chute has at least one opening. The airbag assembly further comprises a door panel assembly including at least one door panel disposed within the chute and connected to the airbag door. The door panel has a downwardly depending flange having at least one projection extending laterally through the at least one opening of the chute.

20 Claims, 4 Drawing Sheets

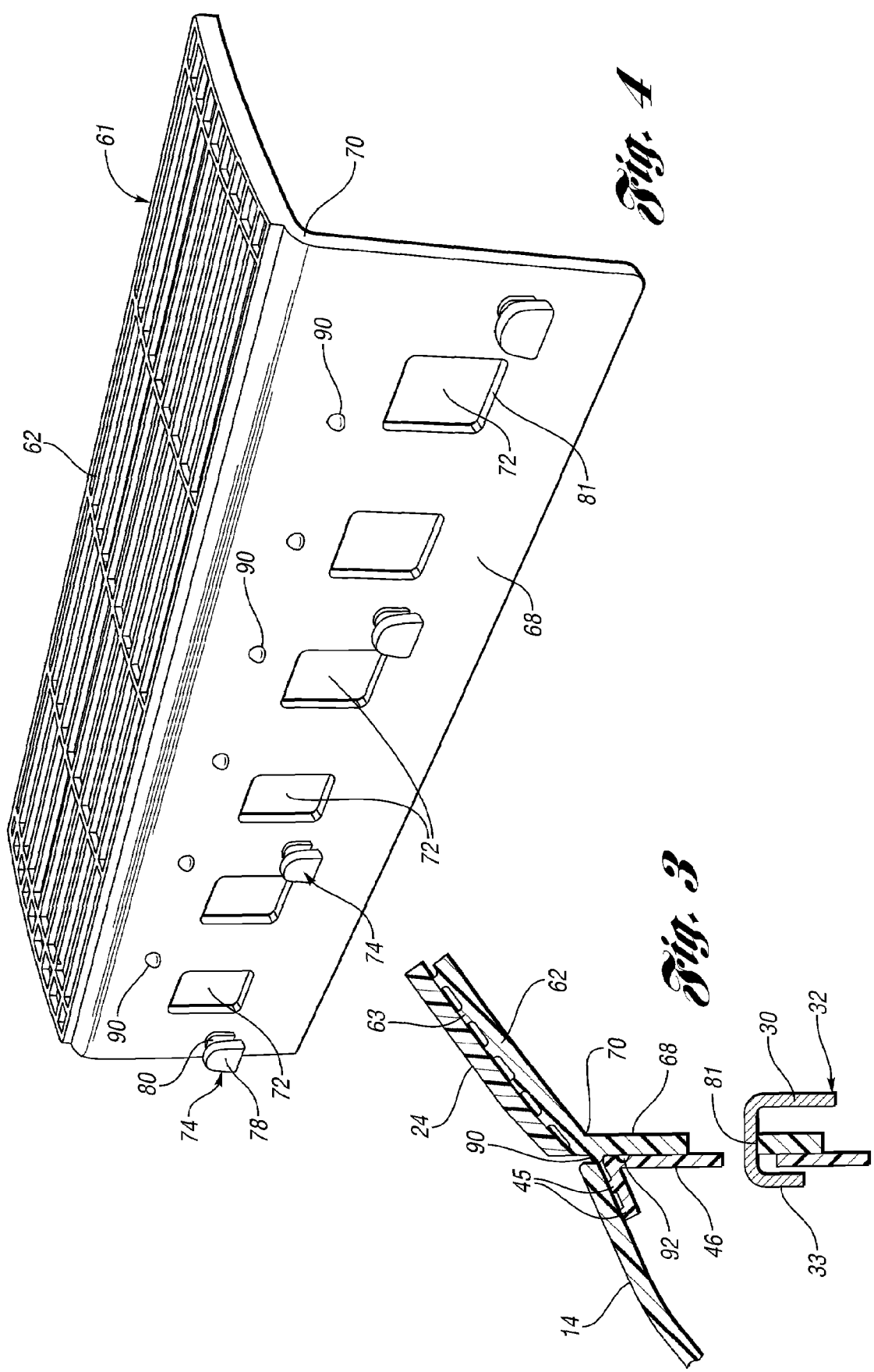

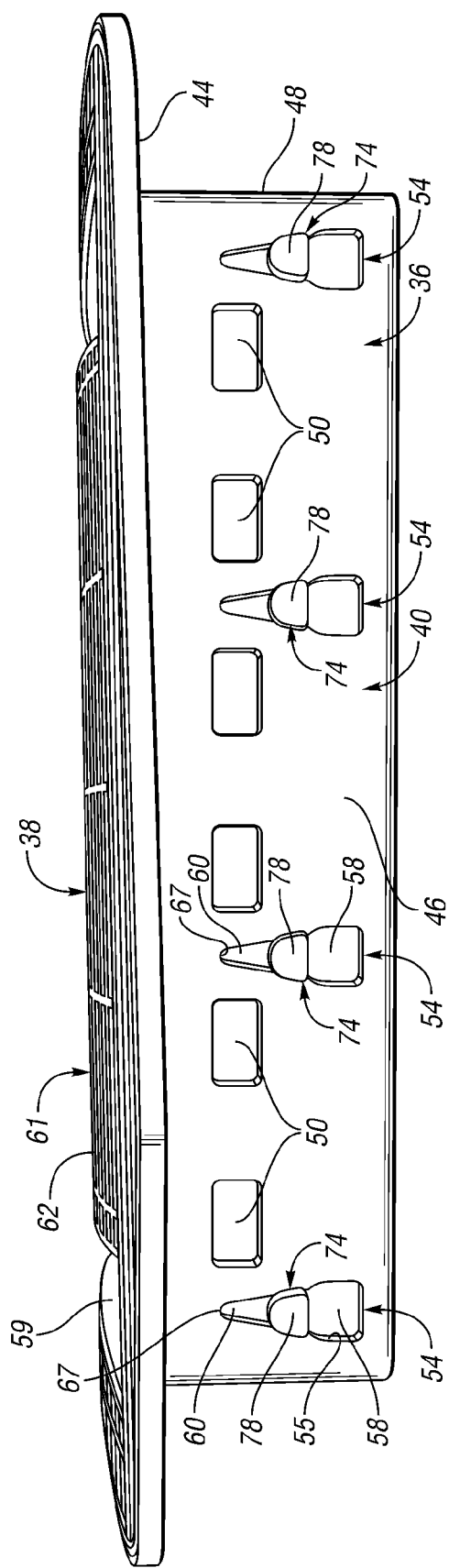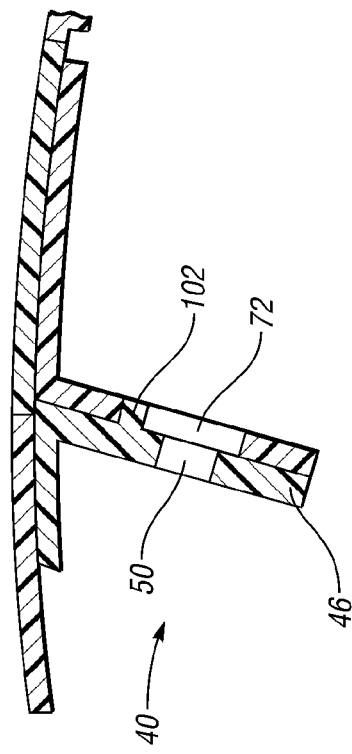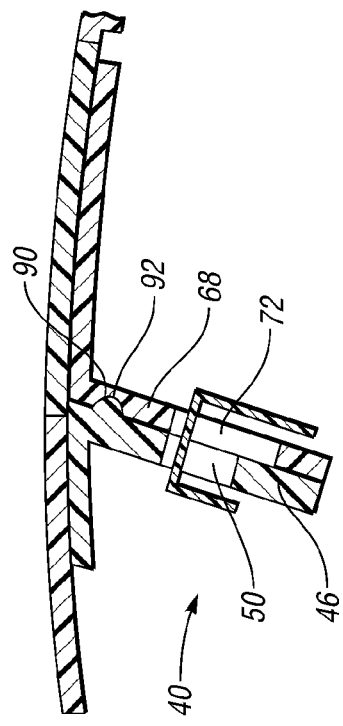

AIRBAG ASSEMBLY

BACKGROUND OF THE INVENTION

1. Field of the Invention

The present invention relates to an airbag assembly, and in particular to a door chute and panel assembly for use with an airbag assembly.

2. Background Art

Airbags are commonly used in motor vehicles, but may also be used in other types of modes of transportation such as trains and airplanes. Specifically, an airbag is stored in a folded condition in a stored receptacle and then rapidly inflates via an inflation fluid, as such with gas from a gas generator or other types of inflators, when an event indicative of a collision of the vehicle is detected by sensors. The airbag then deploys into a position to absorb the impact of the driver or passenger.

Prior airbag assemblies and manufacturing methods are disclosed in U.S. Pat. Nos. 5,769,451; 6,109,645; 6,406,056; and 6,929,280.

SUMMARY OF THE INVENTION

Under the invention, an airbag assembly is provided. In at least one embodiment, the airbag assembly comprises a trim panel having a tear seam forming at least one airbag door, and a door chute assembly comprising a laterally extending flange connected to the trim panel proximate the airbag door. The door chute assembly includes a chute depending from the flange away from the panel. The airbag assembly further comprises a door panel assembly including at least one door panel disposed within the chute and connected to the airbag door. The door panel has a downwardly depending flange received within the chute. In at least this embodiment, at least one of the chute and the flange has at least one projection that engagingly cooperates with the other of the chute and the flange to inhibit relative movement of the door chute assembly and the door panel assembly when they are being connected to the trim panel, with the projection being separable from the other of the chute and the flange so as not to inhibit relative movement of the door chute assembly and the door panel assembly during air bag deployment. In at least this embodiment, the airbag assembly further comprises an inflatable airbag mounted on the door chute.

Under the invention, a door chute and panel assembly is also provided. In at least one embodiment, the door chute and panel assembly comprises a door chute assembly comprising a laterally extending flange connectable to a trim panel proximate an airbag door. The door chute assembly further includes a chute depending from the flange. The door chute and panel assembly further include a door panel assembly including at least one door panel disposed within the chute and connectable to the airbag door. The door panel has a downwardly depending flange received within the chute. In at least one embodiment, at least one of the chute and the flange has at least one projection that engagingly cooperates with the other of the chute and the flange to inhibit relative movement of the door chute assembly and the door panel assembly when they are being connected to the trim panel, with the door projection being separable from the other of the chute and the flange so as not to inhibit relative movement of the door chute assembly and the door panel assembly during air bag deployment.

Under the invention, a method for manufacturing an airbag assembly is also provided. In at least one embodiment, the method for manufacturing an airbag assembly comprises providing a trim panel having a tear seam forming at least one airbag door, providing a door chute assembly comprising a laterally extending flange and a chute depending from the flange, providing a door panel assembly comprising at least one door panel having a downwardly depending flange, inserting the door panel assembly within the chute such that the downwardly depending flange is engagingly received within the chute, and connecting the door chute assembly and the door panel assembly to the trim panel adjacent the tear seam. In at least this embodiment, at least one of the chute and the flange has a projection that engagingly cooperates with the other of the chute and the flange to inhibit relative movement of the door chute assembly and the door panel assembly when they are being connected to the door, with the projection being separable from the other of the chute and the flange so as not to inhibit relative movement of the door chute assembly and the door panel assembly during air bag deployment.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 3 is a view of a portion of the airbag assembly illustrated in FIG. 2 showing parts in a different position;

FIG. 4 is a perspective view of a component of the airbag assembly illustrated in FIGS. 1-3;

FIG. 5 is a side view of components of the airbag assembly illustrated in FIGS. 1-3;

FIG. 6 is a view similar to a portion of FIG. 2 illustrating another embodiment of the invention;

FIG. 7 is a view similar to FIG. 6 illustrating yet another embodiment of the present invention;

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various alternative forms. The Figures are not necessarily to scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reaction and/or the use are to be understood as modified by the word "about" in describing the broader scope of this invention. Practice within the numerical limits stated is generally preferred. Also, unless expressly stated to the contrary, the description of a group or class of materials as suitably preferred for a given purpose in connection with the invention implies that mixtures of any two or more members of the group or class may be equally suitable or preferred.

Figure 1:
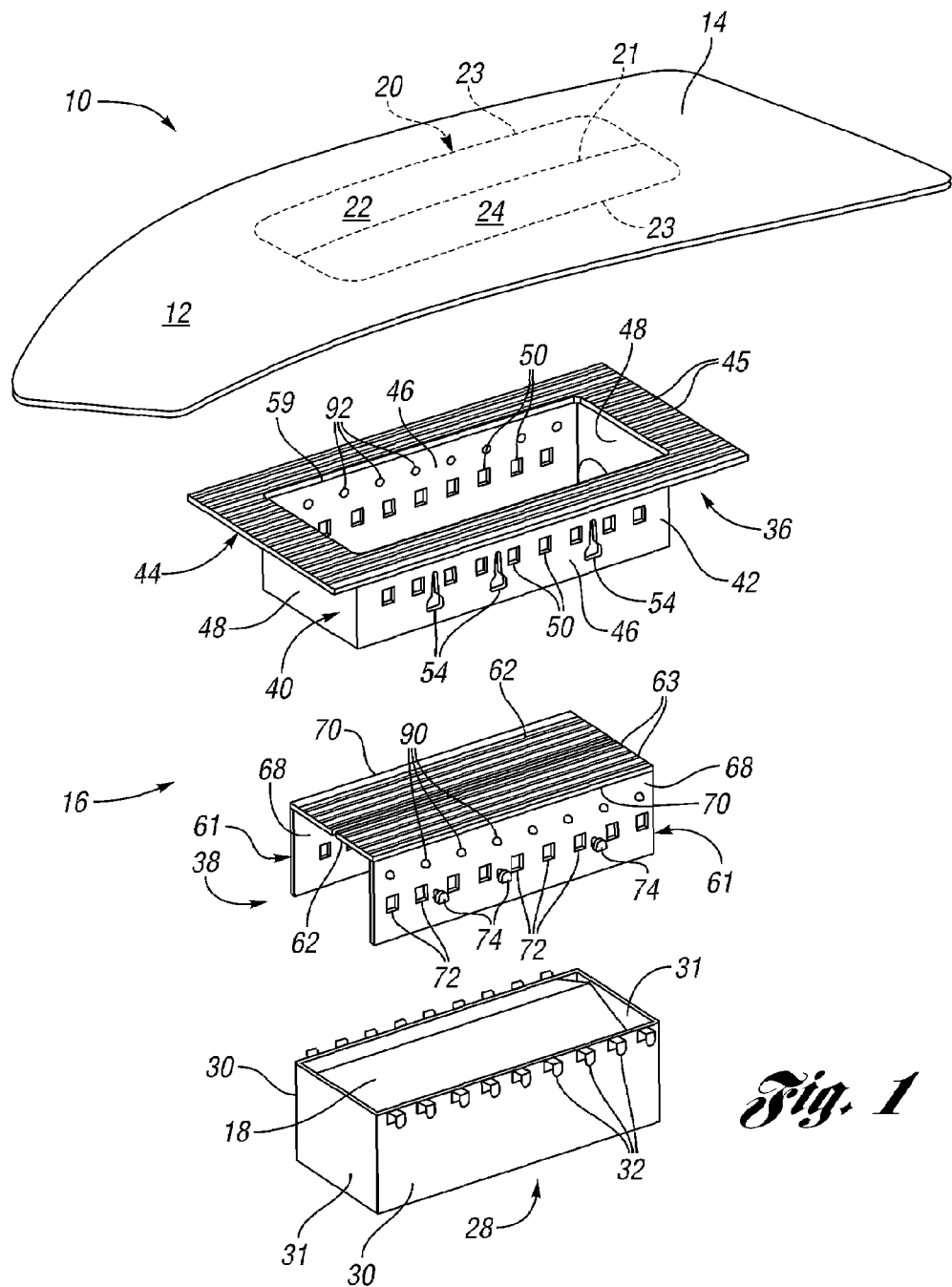
FIG. 1 is an exploded view of an airbag assembly in accordance with at least one embodiment of the present invention.
Figure 2:
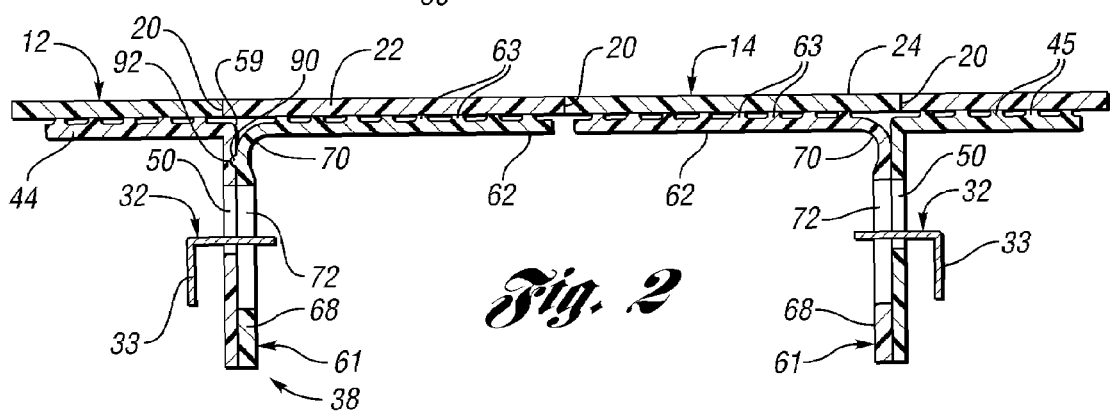
FIG. 2 is a side view of components of the airbag assembly illustrated in FIG. 1.

FIG. 1 shows an exploded view of the airbag assembly 10 in accordance with at least one embodiment of the present invention. Referring to FIGS. 1 and 2, the airbag assembly 10 includes a trim panel, such as an instrument panel 12 that is typically located in front of a windshield (not shown). A portion of the instrument panel 12, illustrated in this embodiment on the passenger side, forms a cover 14 that normally covers and hides an airbag system 16. As should be readily understood, the airbag system 16 can be any type of conventional airbag system having an inflatable airbag 18 for protecting a passenger seated in the passenger compartment. As with other conventional airbag systems 16, the airbag 18 can be inflated by an inflator (not shown) in response to a signal from a controller (now shown) indicating an alert indicative of a collision from a sensing device (not shown), as is well known in the art.

While the passenger compartment is illustrated as being in the front passenger space of the vehicle, it should be understood that the passenger compartment could also be differently located, such as at the driver side or rear passenger space. For instance, the airbag system 16 could alternatively or additionally be a rear and/or side impact airbag system. Moreover, the airbag system 16 could be a driver side system.

The cover 14 illustrated in the Figures comprises a single layer of plastics, such as thermosplastic olefin (TPO). It should be understood however that other types of plastic, such as thermoplastic elastomer (TPE), thermosplastic urethane (TPU), polycarbonate (PC), polypropylene (PP), SMA, acrylonitrile-butadiene-styrene (ABS), and PC/ABS, could also be used. Furthermore, while the cover 14, and thus the instrument panel 12, is illustrated in the Figures as a single layer of plastic, it should be understood that the cover and instrument panel could, in addition to the layer of plastic, include other layers as are known in the art, such as a layer of foam.

Referring to FIG. 1, the cover 14 include a tear seam 20 that, at least in the illustrated embodiment, operates to divide the cover into two door halves 22 and 24. This illustrated tear seam 20 comprises a center seam 21 and two opposed side hinge seams 23. While the tear seam 20 is illustrated in FIG. 1 to have a generally H shape, it should be understood that other configurations of patterns as is known in the art may alternatively be used. Examples of suitable alternative types of patterns include, but are not necessarily limited to, C-, U-, or X-shapes.

The airbag system 16 illustrated in FIG. 1 includes a reaction cannister 28 which houses the airbag 18 (in an undeployed state). The reaction cannister 28 also houses the inflator (not shown) which provide inflation fluid for inflating the airbag 18, when necessary. The reaction cannister 28 illustrated in FIG. 1 is generally rectangular and includes opposed side walls 30 with each side wall having a plurality of hooks 32 extending therefrom. The hooks 32 include a downwardly depending portion 33. The reaction cannister 28 illustrated in FIG. 1, further includes end walls 31 extending between and connecting the side walls 30.

The airbag assembly 16 further include a door chute assembly 36 and a cooperating door panels assembly 38. The door chute 36 and the door panels assembly 38 can both be made of the same or different suitable plastic materials. Examples of suitable plastic materials include, but are not necessarily limited to, thermoplastic elastomer (TPE), thermoplastic polyurethane (TPU), thermoplastic olethin (TPO), polyvinyl chloride (PVC), and polyolefins, such as PP.

The chute assembly 36 and the door panels assembly 38 are secured to the cover 14 in any suitable manner. For instance, the chute assembly 36 and the door panels assembly 38 can be secured to the cover 14 by vibration welding, bolts, screws, rivets, adhesive and sonic welding. The chute assembly 36 helps to guide deployment of the airbag 18 and reinforce the tear seam 20. The door panel assembly 38 helps to open door halves 22 and 24, keep the door panels 61 attached to the chute assembly 30 during deployment, and reinforce the tear seam 20.

The chute assembly 36 in the illustrated embodiment include a generally rectangular chute 40 defined by two opposed side walls 46 connected by two opposed end walls 48. Each of the side walls 46 include spaced apart windows 50. While the windows 50 can have any suitable shape, they are shown in the illustrated embodiments to have generally rectangular shape. In at least one embodiment, the windows 50 are provided and sized to allow hooks 32 to float therein. In at least the illustrated embodiment, each of the side walls 46 also include spaced apart slots 54. It should be understood that the number and location of the windows 50 and the slots 54 can vary as desired.

In at least the embodiment illustrated in the Figures, as best seen in FIG. 5, the slots 54 each include a shaped window opening 58 towards the bottom of the side wall 46 and a relatively thin channel 60 extending from the shaped window opening towards the top 59 of the end wall 48. As can best be seen in FIG. 5, the channel 60 terminates in an end point 67. While the shape of the window opening 58 is illustrated to be an arched shape, it should be understood that the shape of the window opening 58 can be any suitable shape, such as rectangular, square and oval, provided the window opening 58 is big enough to enable the projection 74 to fit within.

As can best be seen in the embodiment illustrated in FIG. 1, the chute assembly 36 includes a flange 44 extending laterally from the top 59 of the chute 40. In at least the illustrated embodiment, the flange 44 extends away from the chute 40 on all four sides of the chute, however, it should be understood that the flange 44 could extend from less than four sides of the chute. For instance, the flange 44 could extend only away from the top 59 of the side walls 46. As can best be seen in FIGS. 1 and 2, in at least the illustrated embodiment, the flange 44 includes laterally extending ribs 45 to help facilitate attachment of the chute assembly 36 to the instrument panel 12. For instance, if the chute 40 is to be vibration welded to the cover 14, the ribs 45 effectively reduce the amount of material required to be welded.

Referring to FIGS. 1 and 2, the door panels assembly 38 includes opposed door panels 61 that fit within the chute assembly 36. Each door panel 61 includes a door portion 62. The door portion 62 as can be best seen in the Figures generally extends laterally underneath the cover 14. As can best be seen in FIGS. 1, 2 and 4, each door portion 62 includes laterally extending ribs 63 to help facilitate attachment of the door panels 61 to the cover 14. Each door panel 61 further include a downwardly depending flange 68. Each door panel 61 includes a hinge 70 extending between and connecting the door portion 62 and the downwardly depending flange 68.

In at least one embodiment, as can best be seen by FIGS. 1 and 4, each downwardly depending flange 68 includes spaced apart flange window openings 72 and spaced apart projections 74 extending from the downwardly depending flange 68. Each projection 74 is received within a respective slot 54 to help guide upward movement of the panels 61 during air bag deployment. It should be understood that the number and location of the window openings 72 and the projections 74 can vary as desired. Moreover, it should be understood that the projections 74, and thus the slots, could be omitted. While the windows openings 72 can have any suitable shape, they are shown in the illustrated embodiments to have generally rectangular shape. While the windows 72 can have any suitable size, in at least one embodiment, they should have a height that is sufficient (i.e., long enough) to enable the hinge 70 of the door panels 62 to extend above the "A" surface of the instrument panel 12 upon deployment.

Each of the projections 74 include a shaped base 78 and an arm 80 that extends between and connects the base 78 with the downwardly depending flange 68. As can be seen in the Figures, the base 78, while generally the same shape as the window opening 58, is smaller in size then the window opening 58 such that the base 78 can be slid through the window opening 58 so the arm 80 can be received within the slot 54. It should be understood however that while being illustrated as being the same general shape as the shape of the window 58, the shape of the base 78 could differ from the shape of the window 58 so long as the base 78 is insertable receivable within the window 58 in a T-slot type of manner. The arm 80 is generally the same thickness as the slot channel 60, such that the arm 80 can be received within the slot and maintain therewith. The arm 80, in at least one embodiment, is the same width as the thickness of the side wall 46 of the chute 40.

In at least the illustrated embodiment, the hooks 32 from the reaction cannister 28 go through the windows 72 and 50 in the door panels 61 and chute assembly 36, respectively. Upon deployment of the airbag 18, as shown schematically in FIG. 3, the deploying airbag 18 (not shown in FIG. 3) causes movement of the door panels 61 relative to the door chute assembly 36 and the portions of the instrument panel 12 adjacent the cover 14. The deployment of the airbag 18 causes the door panels 61 to move upwardly until the bottom edge 81 of the window 72 contact the hooks 32 of the airbag cannister 28. Essentially, the hooks 32 restrain the upper movement of the panels 61 caused by inflation of the airbag 18 as the bottom surfaces of the windows 72 engage the hooks 32. At this point, the hinges 70 of the door panels 61 are above the portion of the instrument panel 12 adjacent the cover 14 such that the door portions 62 of the door panel 61 are above the show surface (i.e., the outer or "A" surface) of the instrument panel 12 before the airbag doors 22 and 24, respectively, and the door portions 62 of the panels 61 pivot to provide an opening for the airbag 18 to extend there through.

In at least the illustrated embodiment, while deployment of the airbag 18 is taking place, the projections 74 slide up within the channels 60 of the slots 54. The projection 74 also add a secondary retention system for the door panels 60 as the projection engage the top 67 of the slot 54. Moreover, the projections 74 and the slots 54 also cooperate to hold the door panel assembly 38 to the chute assembly 36 as an assembly aid for securing the chute assembly 36 and door panels assembly 38 to the instrument panel 12. The projections 74 also cooperate with the slots 54 to increase the hooks 32 ability to remain engaged to the chute assembly 36 and door panels assembly 38 during deployment.

The chute assembly 36 and the door panel assembly 38 are engagingly coupled to each other for maintaining them together during assembly, and in particular during vibration welding to the cover 14, but are disengageable from each other during deployment of the airbag. The chute and/or panel assemblies 36 and 38 are provided with structures, at least including projections, for aiding in assembly.

In at least one embodiment, as best illustrated in FIGS. 2 and 4, the depending flange 68 of the panels 61 is provided with one or more rounded projections 90 (only one of which is shown in FIG. 2), shown in the shape of a semi-circle, extending from the flange 68 into the side wall 46 of the chute 40. The side wall 46 may have corresponding recesses 92, as illustrated in FIGS. 1-3, each for receipt of a respective one of the rounded projections 90. For instance, a plurality of spaced apart projections 90 can be provided on the depending flange 68 of each door panel 61 with corresponding recesses 92 being provided on the opposed side walls 46 of the chute. While the chute assembly 36 and the door panel assembly 38 are within the vibration weld tool, the rounded projections 90 are maintained in the recess 92 to maintain the panels 61 within the chute 40 during assembly. Upon deployment of the air bag, the panel 61 is urged upwardly, as shown in FIG. 3, and the rounded projections 90 disengage from the recesses 92. While a plurality of rounded projections 90 and corresponding recesses 92 are shown in FIGS. 1 and 4, it should be understood that the number of rounded projections 90 and corresponding recesses 92 vary as desired. For instance, only one projection 90 and corresponding recess 92 could be located on a respective flange 68, and side walls 46.

While the projections 90 are shown to be on the flanges 68 while the recesses 92 are shown to be on the side walls 46, it should be understood that the orientation of the projections and recesses could be reversed, not just in this embodiment but in all of them. For instance, referring to FIG. 6, another embodiment of the present invention is illustrated. In this embodiment, the rounded projection(s) 90 is/are located on the side wall 46 of the chute 40 with the corresponding recess (es) 92 being located on the outer surface of the depending flange 68 of the door panel 61.

Referring to FIG. 7, another embodiment of the present invention is illustrated. In this embodiment, one or more spaced apart projections 102 extend from the side walls 46 of the chute and are received within respective opening(s) 72 of the door panels 61. In this embodiment, the projections 102 are engagingly received within the openings 72 in an interference fit. Deployment of the air bag causes the projections 102 to disengage from the openings 72 during air bag deployment. While the projections 102 are shown to be on the chute 40, it should be understood that the projections 102 could be on the door panel 61 and received via an interference fit within an opening of the chute, such as opening 50.

Figure 8:
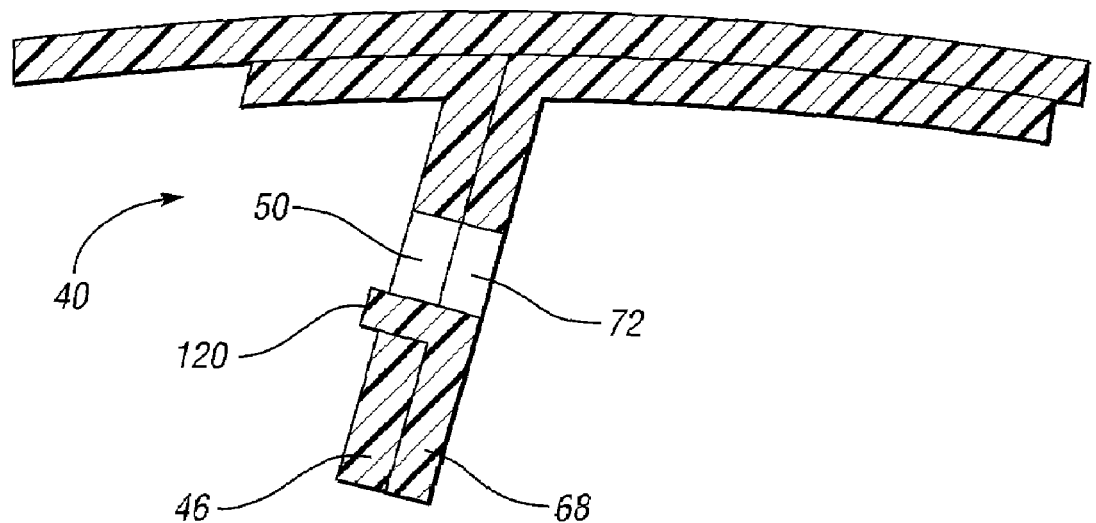
FIG. 8 is a view similar to FIG. 6 illustrating still yet another embodiment of the present invention.
Figure 9:
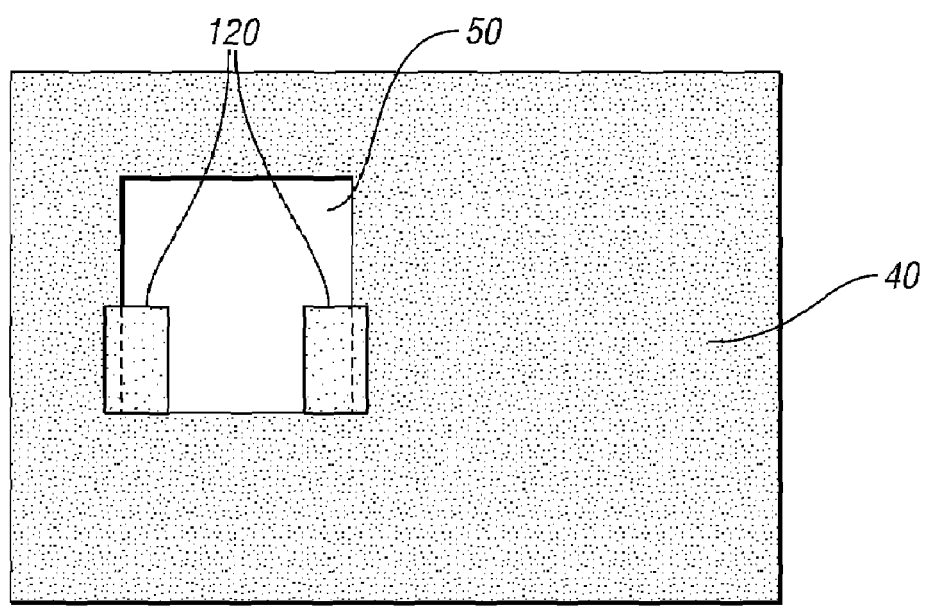
FIG. 9 is a side view of a component illustrated in FIG. 8.

FIGS. 8 and 9 show another embodiment of the present invention. In this embodiment, spaced apart projections 120 extend from the door panel 60 and are received within opposing ends via an interference fit of window 50 in the chute 40. As with other embodiments, it should be understood that the orientation of the projection 120 and the window 50 could be reversed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An airbag assembly comprising;
   a trim panel having a tear seam forming at least one airbag door;
   a door chute assembly comprising a laterally extending flange connected to the trim panel proximate the airbag door, the door chute assembly including a chute depending from the flange away from the panel;
   a door panel assembly including at least one door panel disposed within the chute and connected to the airbag door, the door panel having a downwardly depending flange received within the chute;
   at least one of the chute and the flange having at least one projection that engagingly cooperates with the other of the chute and the flange to inhibit relative movement of the door chute assembly and the door panel assembly when they are being connected to the trim panel, the projection being separable from the other of the chute and the flange so as not to inhibit relative movement of the door chute assembly and the door panel assembly during airbag deployment; and an airbag assembly comprising an inflatable airbag mounted on the door chute.

2. The airbag assembly of claim 1 wherein the chute of the door chute assembly comprises a rectangular wall having two opposed side wall portions and two opposed end wall portions extending between and connecting the side wall portions.

3. The airbag assembly of claim 2 wherein the projection is located on at least one of the side wall portions and a recess is located on the downwardly depending flange for receiving the projection.

4. The airbag assembly of claim 3 wherein the recess comprises a dimple which the projection is received within.

5. The airbag assembly of claim 3 wherein the recess comprises an opening which the projection extends through.

6. The airbag assembly of claim 2 wherein the at least one projection comprises two spaced apart projections that are engagingly received within a window on the downwardly depending flange.

7. The airbag assembly of claim 2 wherein the projection is a semi-circle located on the downwardly depending flange and at least one of the side walls has a recess for receiving the projection.

8. The airbag assembly of claim 7 wherein the recess comprises a circular opening which the semi-circle projection is received within.

9. The airbag assembly of claim 2 wherein the at least one projection comprises a plurality of projections, a first portion of the plurality of projections being located on the first side wall and a second portion of the plurality of projections being located on the second side wall, the at least one door panel comprising two door panels with each of the door panels comprising a downwardly depending flange, each of the flanges having at least one recess for receiving a respective projection.

10. The airbag assembly of claim 2 wherein the at least one projection comprises a plurality of projections, and the at least one door panel comprising two door panels with each of the door panels comprising a downwardly depending flange, a first portion of the plurality of projections being located on the first downwardly depending flange and a second portion of the plurality of projections being located on the second downwardly depending flange, each of the side walls having at least one recess for receiving a respective projection.

11. The airbag apparatus of claim 8 wherein the at least one opening comprises a plurality of spaced apart openings disposed on the chute, wherein each of the projections extends through a respective one of the openings.

12. The airbag assembly of claim 4 wherein the projection extends into the opening but not through it.

13. A door chute and panel assembly for use with an airbag assembly comprising a trim panel having a tear seam forming at least one airbag door, and an airbag assembly comprising an inflatable airbag, the door chute and panel assembly comprising:

a door chute assembly comprising a laterally extending flange connectable to the trim panel proximate the airbag door, the door chute assembly including a chute depending from the flange, wherein the chute comprises a rectangular wall having two opposed side wall portions and two opposed end wall portions extending between and connecting the side wall portions, at least one of the side walls including a plurality of spaced apart slots; and a door panel assembly including at least one door panel disposed within the chute and connectable to the airbag door, the door panel having a downwardly depending flange received within the chute, the flange having a plurality of spaced apart major projections with each major projection extending through a respective one of the slots;

at least one of the chute and the flange having at least one minor projection that engagingly cooperates with the other of the chute and the flange to inhibit relative movement of the door chute assembly and the door panel assembly when they are being connected to the trim, the minor projection being separable from the other of the chute and the flange so as not to inhibit relative movement of the door chute assembly and the door panel assembly during airbag deployment.

14. The airbag assembly of claim 13 wherein the minor projection is located on at least one of the side wall portions and a recess is located on the downwardly depending flange for receiving the minor projection.

15. The airbag assembly of claim 14 wherein the recess comprises a dimple which the minor projection is received within.

16. The airbag assembly of claim 15 wherein the recess comprises an opening which the minor projection extends through.

17. The airbag assembly of claim 13 wherein the minor projection is located on the downwardly depending flange and at least one of the side walls has a recess for receiving the projection.

18. A method for manufacturing an airbag assembly, the method comprising:

providing a trim panel having a tear seam forming at least one airbag door;

providing a door chute assembly comprising a laterally extending flange and a chute depending from the flange;

providing a door panel assembly comprising at least one door panel having a downwardly depending flange;

inserting the door panel assembly within the chute such that the downwardly depending flange is engagingly received within the chute; and connecting the door chute assembly and the door panel assembly to the trim panel adjacent the tear seam;

at least one of the chute and the flange having a projection that engagingly cooperates with the other of the chute and the flange to inhibit relative movement of the door chute assembly and the door panel assembly when they are being connected to the door, the projection being separable from the other of the chute and the flange so as not to inhibit relative movement of the door chute assembly and the door panel assembly during airbag deployment.

19. The method of claim 18 wherein the door chute assembly and the door panel assembly are simultaneously connected to the trim panel.

20. The method of claim 19 wherein the door chute assembly and the door panel assembly are connected by vibration welding to the trim panel.

* * * * *